(12) United States Patent
Ohno

(10) Patent No.: US 7,091,636 B2
(45) Date of Patent: Aug. 15, 2006

(54) POSITION-CONTROL STAGE SYSTEM

(75) Inventor: Masaki Ohno, Kamakura (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 11/116,343

(22) Filed: Apr. 28, 2005

(65) Prior Publication Data
US 2005/0258697 A1    Nov. 24, 2005

(30) Foreign Application Priority Data
May 24, 2004  (JP)  ............................. 2004-153439

(51) Int. Cl.
*H02K 5/00* (2006.01)
*H02K 5/173* (2006.01)
(52) U.S. Cl. .................... 310/67 R; 310/49 R; 310/90; 310/156.32; 310/156.36; 310/268
(58) Field of Classification Search ................. 310/12, 310/13, 14, 49 R, 67 R, 90, 156.36, 156.82, 310/156.32, 268
See application file for complete search history.

(56) References Cited
U.S. PATENT DOCUMENTS

| | | | | |
|---|---|---|---|---|
| 4,851,731 A | * | 7/1989 | Saotome et al. ............. | 310/258 |
| 5,608,278 A | * | 3/1997 | Mey et al. ..................... | 310/90 |
| 6,414,742 B1 | * | 7/2002 | Korenaga et al. ............. | 355/53 |
| 6,552,449 B1 | | 4/2003 | Tsuboi et al. | |
| 6,828,705 B1 | * | 12/2004 | Choi et al. ..................... | 310/81 |
| 2002/0163257 A1 | * | 11/2002 | Tsuboi et al. ................. | 310/12 |
| 2004/0061383 A1 | * | 4/2004 | Tsuboi et al. ................. | 310/13 |

FOREIGN PATENT DOCUMENTS

| | | |
|---|---|---|
| JP | 05-091710 | 9/1993 |
| JP | 2002-328191 | 11/2002 |
| JP | 2004-072960 | 4/2004 |

* cited by examiner

*Primary Examiner*—Burton S. Mullins
*Assistant Examiner*—David W. Scheuermann
(74) *Attorney, Agent, or Firm*—Browdy and Neimark, PLLC

(57) ABSTRACT

A position-control stage system is disclosed, which is enhanced in prolusion to turn a turntable relatively to a bed through a bearing and also improved in operating performances including high-speed traveling and high response, even with made as small as allowed in diametral dimension. To this end, a motor includes a primary side having armature windings lying on a circular flat surface of a first retainer member secured to the bed, and a secondary side having a field magnet secured on the turntable. The bearing has an outer race held in place with combination of the bed and the first retainer member, and an inner race held in place with combination of the turntable and a second retainer member.

8 Claims, 6 Drawing Sheets

POSITION-CONTROL STAGE SYSTEM

FIELD OF THE INVENTION

The present invention relates to a position-control stage system with onboard a motor, which has been extensively used in fields as diverse as semiconductor manufacturing equipments, assembling machines, precise testing machines, and so on.

BACKGROUND OF THE INVENTION

In recent years, position-control stage systems have been needed to be compact or slim in construction and able to operate with high speed and high response to make sure of high speed movement and accurate position control so as to meet anticipated design requirements in extensively increased fields including semiconductor industries, and the like.

The prior position-control stage system is in general provided therein with an onboard permanent-magnet motor that is comprised of a primary side having armature windings and a secondary side having field magnets, the armature windings being made of three-phase coreless windings wound in annular flat configuration and arranged on a stationary bed in juxtaposition with one another along a circular pattern of a preselected radius of curvature in a way each of which is oriented in a radial direction of the circular pattern. The prior position-control stage system constructed as stated earlier is envisaged making it easier to extend largely an angular movement in circular direction for position control, rendering the position-control stage system itself compact or slim in construction, allowing the position-control stage system to work with high precision in clean environment and further produce the stage system with inexpensive cost. An example of the prior position-control stage systems as stated earlier is disclosed in, for example Japanese Patent Laid-Open No. 2004-72960 in which there is installed an onboard motor made up of the primary side having armature windings and the secondary side having field magnets. The armature windings are made of three-phase coreless windings wound in annular flat configuration. The armature windings are arranged on a stationary bed in juxtaposition with one another along a circular pattern of a preselected radius of curvature in a way each of which is oriented in a radial direction of the circular pattern. Magnet segments to provide a field magnet are each made in a rectangular shape. The magnet segments are oriented in radial direction respectively and disposed on a turntable in opposition to the armature windings in a way alternating in polarity circularly.

Disclosed in for example Japanese Patent Laid-Open No. 2002-328191 is a stage system with an onboard linear motor, in which just tiny angular position-control may be performed by virtue of the linear motor. The prior stage system is made smaller in construction as well as reduced in the overall height and also improved in response to high-speed operation. The prior stage system is comprised of a first stage lying on a base stage for linear movement in an X-direction relatively to the base stage, a second stage lying on the first stage for linear movement relatively to the first stage in a Y-direction, a turning stage supported on the second stage through a rolling-contact bearing, and a linear motor causing the turning stage to move angularly towards any desired position over a tiny angle in circular direction.

Another Japanese Patent Laid-Open No. H05-91710, moreover, disclosed a motor for swinging motion, which is comprised of even permanent-magnet segments for field magnet positioned in a circular direction at regular intervals in a way alternating in polarity circularly around a rotating axis, and armature windings equal in number with the poles of the permanent-magnet segments and lying in opposition to the permanent-magnet segments. Either of the permanent-magnet segments and the armature windings serves as the stator while the other is the rotor in a construction that a yoke is always set on the side of the stator. Moreover, the armature windings to create the propulsion are made equivalent in number in conformity with the number of the permanent-magnet segments for the field magnet to make the motor simple in construction. More specially, the number of the armature windings is selected to an even number as small as allowed so long as ensuring the desired propulsion.

The prior position-control stage systems constructed as stated earlier, although but having been made measurably compact in construction, nevertheless, are thought to still remain even larger in size. With these prior position-control stage systems constructed as stated earlier, moreover, the armature windings are made in annular rectangle in configuration while many magnet segments for the field magnet are also made rectangular in shape in order for the manufacturers to utilize versatile components for the linear motors in other linear motion guide units in favor of the stage systems inexpensive in production cost. That is to say, the prior position-control stage systems recited above have required many armature windings for the armature assembly and many magnet segments for the field magnet to generate propulsion desired to turn the turntable. The armature windings and the magnet segments have been both positioned in circular direction. This circular construction of the armature windings and the magnet segments results in rendering the stage systems large or bulky in contour or in outside diameter thereof. Thus, it remains a major challenge to make the position-control stage system much smaller in construction, even with enhancing propulsion desired to turn a turntable. Moreover, the motor for swinging motion constructed as recited earlier, because of envisaged making position control of the magnetic head in the magnetic disc unit, would be unfit in construction for the stage system to control the workpiece, mounted on the stage system, in circular position.

SUMMARY OF THE INVENTION

The present invention, therefore, has as its primary object to overcome the subject as described just above and more particular to provide a position-control stage system with an onboard direct-drive motor in which armature windings of coreless type are disposed on a stationary bed in closely juxtaposed relation with one another inside a circular flange raised around a turntable to ensure the propulsion as powerful as possible. Moreover, the present invention is envisaged providing a position-control stage system with an onboard direct-drive motor in which an armature assembly fits on a retainer member that is to keep a rolling-contact bearing in place, thereby ensuring much space to install the armature assembly, even with as small as allowable in diametral dimension, and correspondingly making a turntable as smaller as possible in diameter, even with high in propulsion and efficient in operating performances including high-speed traveling, high response, high-precision position-control, and so on.

The present invention is concerned with a position-control stage system; comprising a bed, a turntable supported for rotation on the bed through a bearing, and a motor forcing the turntable relatively to the bed in a circular direction, the motor including a primary side having an armature assembly and a secondary side having a field magnet; wherein the armature assembly is composed of armature windings made of coreless annular coils wound in a form of a flat configuration; wherein the field magnet is composed of magnet segments made in a form of flat configuration, which are juxtaposed underneath the turntable in opposition to the armature windings in such an array that they alternate in polarity circularly in circumferential direction; wherein the bearing is fastened to the bed with using the bed and a first retainer member secured to the bed: and wherein the armature windings are closely juxtaposed on a circular surface of the first retainer member in circular direction.

In one aspect of the present invention, there is provided a position-control stage system in which the first retainer member fits into a circular recess defined between a journal portion extended at a center of the turntable and a circular flange raised around an outside periphery of the turntable, while the armature windings are each made in a dimension extending across an overall radial length of the first retainer member.

In another aspect of the present invention, there is provided a position-control stage system in which the first retainer member fits closely inside a circular ridge raised above an upper surface of the bed.

In another aspect of the present invention there is provided a position-control stage system in which the coreless armature windings are disposed in close juxtaposition with one another in a way their adjoining radial coil sides become splayed in area with neither overlapping partially with one another, nor separating away from one another in circular direction.

In another aspect of the present invention, there is provided a position-control stage system in which the bearing is comprised of an inner race held in place with combination of the turntable and a second retainer member that is fastened to an axial end of the journal portion of the turntable, an outer race laid radially outside the inner race and held in place with combination of the bed and the first retainer member, and more than one rolling element of roller disposed between the inner and outer races in a circular direction in a way any two adjacent rollers are oppositely inclined with their own axes intersecting alternately one another.

In a further another aspect of the present invention, there is provided a position-control stage system in which the armature assembly is composed of the armature windings and a winding board extending to cover throughout over the armature windings, the armature assembly together with the first retainer member fits into the circular recess defined between the journal portion and the circular flange of the turntable, and the bed is made with an aperture to receive therein the second retainer member secured to the journal portion of the turntable.

In another aspect of the present invention, there is provided a position-control stage system in which the circular flange rising around the turntable encloses both the armature windings and the first retainer member providing a yoke for the armature windings to keep magnetic flux against magnetic leakage and double as a cover to protect them.

In another aspect of the present invention, there is provided a position-control stage system in which the armature assembly lying on the bed through a first retainer member is made up of six armature windings while the field magnet on the turntable is made up of eleven magnet segments, but the armature windings lying on the bed are available up to nine at the maximum in number while the magnet segments are allowed to fit them on the turntable up to twelve at the maximum.

The position-control stage system of the present invention has the constructional feature in which the outer race of the bearing to carry the turntable for rotation on the bed is held in place with the first retainer member on which the armature assembly is installed helps make the stage system as small as allowed in the overall height as well as in diametral dimension, thereby shrinking the stage system down.

Thus, the position-control stage system of the present invention constructed as stated earlier may be made as smaller as possible in diameter and in height, compared with the prior position-control stage system disclosed in the commonly assigned Japanese Patent Laid-Open No. 2004-72960. Installation of the armature windings on the retainer member lying on the bed and close juxtaposition of the coreless armature windings on the retainer member in circular direction conjoin to make certain of shrinking the bed down as small as possible in dimension with ensuring circular space enough in area to array the armature windings having coil sides extended in their areas. Correspondingly, the turntable on which the field magnet is seated may be made as compact as allowed in conformity with the bed, even with enhancing the propulsion to drive the turntable in circular direction with high operating performances including high-speed turning, high response, high-precision position-control.

The above and other related aspects and features of the present invention will be more apparent to those skilled in the art from a reading of the following description of the disclosure found in the accompanying drawings and the novelty thereof pointed out in the appended claims.

DETAILED DESCRIPTION OF THE PREFERRED EMBODIMENTS

Figure 1:
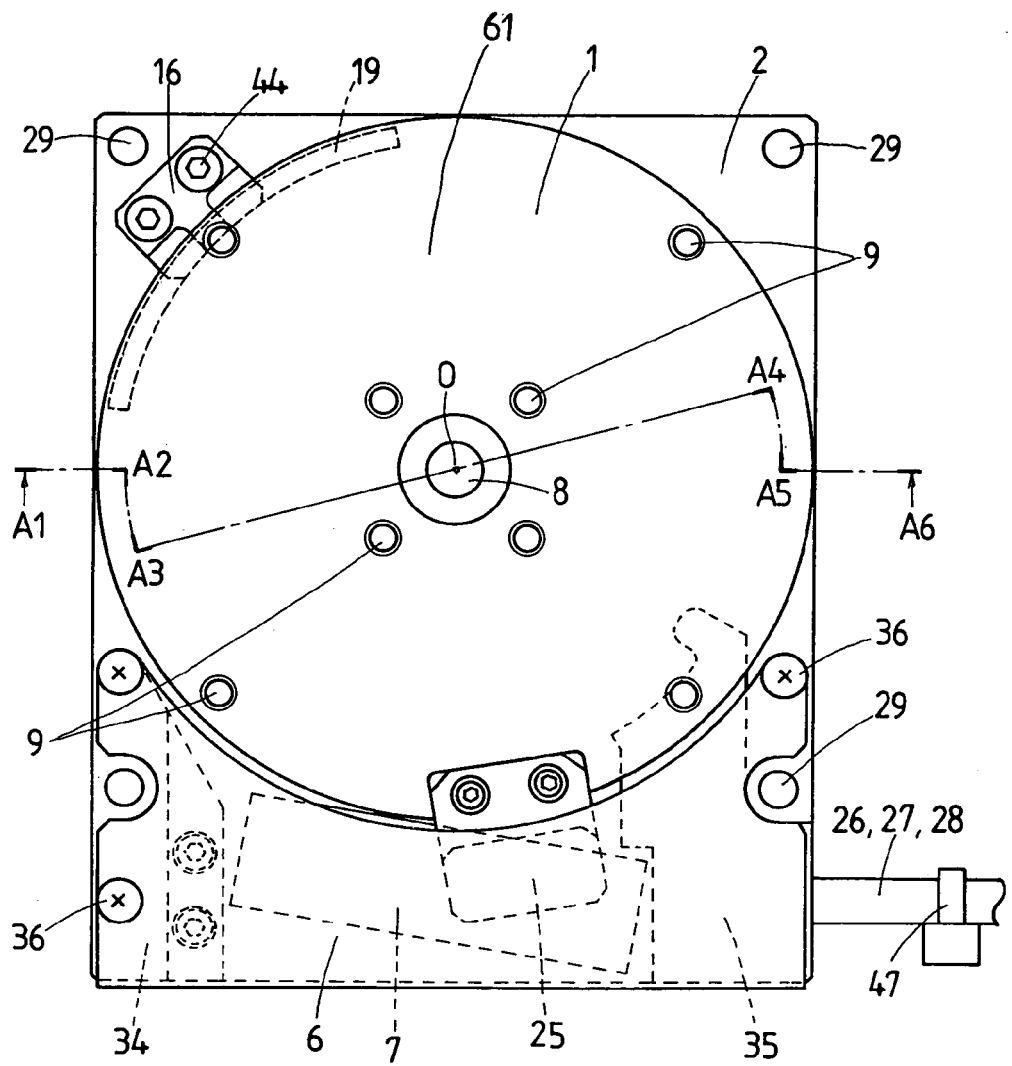
FIG. 1 is a plan view showing a preferred embodiment of a position-control stage system according to the present invention.

The position-control stage system of the present invention is designed to serve well for machinery including semiconductor manufacturing equipment, assembling machines, measuring instruments, testing instruments, position-control table system, sliding table system, and so on, which are expected to operate in any controlled atmosphere as in, for example clean rooms, testing/experimental laboratories, and the like. The position-control stage system of the present invention is used well on a variety of mounting base or instruments including X-axis traveling table, Y-axis traveling table, and so on to achieve the position-control in any of X-, Y- and θ-directions. Where the position-control stage system of the present invention would be expected to make the position control in X-, Y-, and θ-directions, the turntable 1 could control any circular movement in θ-direction.

A preferred embodiment of a position-control stage system according to the present invention will be explained hereinafter in detail with reference to the accompanying drawings. The position-control stage system of the present invention, besides the constructional features common to the position-control stage system disclosed in the commonly assigned Japanese Patent Laid-Open No. 2004-72960, is envisaged further developing the existing position-control stage system as disclosed previously. The position-control stage system of the present invention is made smaller in dimension compared with the existing position-control stage system, even with simple in construction, and also may achieve high performances including high-speed movement, high response, high-precision position-control, and so on, even with high in propulsion. The position-control stage system of the present invention is made high in stiffness and compact or slim in construction.

The position-control stage system of the present invention, as shown in FIGS. 1 to 3 and 7, is mainly comprised of a stationary bed 2, a turntable 1 carried on the bed 2 for rotation through a rolling-contact bearing 3, and a permanent-magnet motor 24 to drive the turntable 1 in circular direction relatively to the bed 2. The permanent-magnet motor 24 is constructed to provide a direct-drive motor to turn directly the turntable 1, which is comprised of a primary side having an armature assembly 10 made up of many armature windings 5, and a secondary side having a field magnet array 4 made up of many permanent-magnet segments 4M.

The turntable 1 includes a major portion 61 made with threaded holes 9 that are used to fasten any other component including a workpiece, and so on to an upper flat surface of the turntable 1, a cylindrical journal portion 52 extended downwards at the center of the turntable 1, and a circular flange 20 raised downwards above the underneath of the major portion 61 around an outside periphery of the major portion 61. With the turntable 1 constructed as stated earlier, there is made an circular recess 53 extending between the cylindrical journal portion 52 and the circular flange 20 to accommodate snugly the armature assembly 10 therein. On the underneath of the major portion 61 of the turntable 1 between the cylindrical journal portion 52 and the circular flange 20, further, there is made a circular sink 14 that is made deep below a bottom of the circular recess 53 to fit snugly the field magnet 4 into there. The journal portion 52 of the turntable 1 is made with an axial hole 8 extending in line with the center (O) of the turntable 1 to serve for setting the position-control stage system in place. The axial hole 8 is also counter-bored for weight reduction. Fastened on the axial end of the journal portion 52 of the turntable 1 is a retainer member or a second retainer member 23 with using fastening screws 49. The second retainer member 23 is made therein with an opening 58 in alignment with the axial hole 8 in the journal portion 52.

When the position-control stage system of the present invention is, for example, expected to achieve the position-control in any of X-, Y- and θ-directions, the stationary bed 2 is mounted to a Y-axis traveling table while the turntable 1 can control any circular movement in θ-direction. The stationary bed 2 is provided on the underneath 39 thereof with some flat areas 43, shown in FIG. 4, at which the bed 2 comes into mating with any of the Y-axis traveling table, other component, and so on, and bolt holes 29 that are used to fasten the bed 2 to any of the Y-axis traveling table, other component, and so on. The bed 2 has an aperture 62 at the center thereof and also circular ridge 54 raised above an upper surface of the bed 2 in a way extending circumferentially far away from the aperture 62.

With the position-control stage system constructed as stated earlier, the armature assembly 10 fits together with a retainer member or a first retainer member 22 into the circular recess 53 defined between the journal portion 52 and the circular flange 20 of the turntable 1. The first retainer member 22 is made in an annular contour where there are made an axial opening 50 to fit over the journal portion 52 of the turntable 1, and a circular ridge 55 raised downwards underneath the first retainer member 22. The aperture 62 made in the bed 2 fits closely over the second retainer member 23 fastened to the journal portion 52 of the turntable 1. Thus, constructional feature as stated earlier is effective to make the position-control stage system less in the overall height (H), thereby shrinking the stage system itself in construction.

A rolling-contact bearing 3 is interposed between the turntable 1 and the bed 2 to carry the turntable 1 for rotation relatively to the bed 2. The rolling-contact bearing 3 disposed between the turntable 1 and the bed 2 is composed of an inner race 13 fastened to the turntable 1, an outer race 12 fastened to the bed 2, and more than one rolling element of a roller 31 disposed between the inner and outer races 13 and 12. The rolling-contact bearing 3 is the type referred to as "cross-roller bearings" because of their construction where many cylindrical rollers 31 are arranged in circular direction in such a way any two adjacent rollers 31 are oppositely inclined with their own axes intersecting alternately one another, making it possible to carry both radial and thrust loads. The rolling-contact bearing 3 fits into a bearing housing 41 that is constituted with circular housing halves, one 32 of which is defined with the bed 2 and the first retainer member 22 and the other 33 is defined with the turntable 1 and the second retainer member 23. More especially, the inner race 13 of the rolling-contact bearing 3 fits into the circular housing half 33 that is formed with a circular recess cut around the end of the journal portion 52 of the turntable 1 and a mating recess 57 made by cutting away an outside circular edge on the upper surface of the second retainer member 23. The inner race 13 of the rolling-contact bearing 3 is held in place by the fastening screws 49, which are screwed into the axial journal portion 52 after having extended through the bolt holes in the second retainer member 23. In contrast, the outer race 12 of the rolling-contact bearing 3 fits into the circular housing half 32 that is formed with a circular upper surface around the aperture 62 in the bed 2 and a mating circular surface 56 inside the circular ridge 55 of the first retainer member 22. The outer race 12 of the rolling-contact bearing 3 is kept in place by fastening screws 48, which are driven into the first retainer member 22 after having extended through the bolt holes in the bed 2.

The armature assembly 10 includes many armature windings 5 lying on a supporting surface 15 of the first retainer member 22 secured to the bed 2, and a winding board 11 extending to cover throughout over the armature windings 5.

Figure 3:
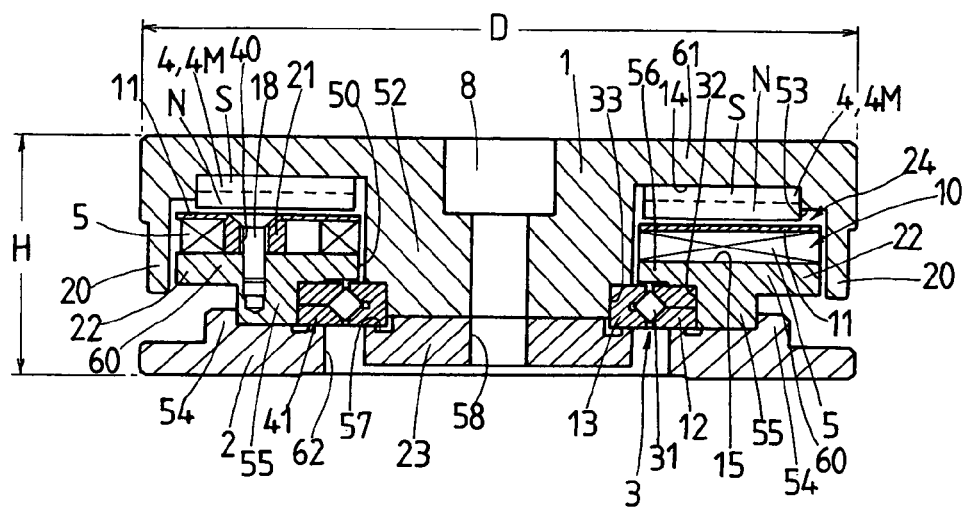
FIG. 3 is a view in cross section of the position-control stage system of FIG. 1, the view being taken along the plane A1-A2-A3-A4-A5-A6 of the same figure.
Figure 8:
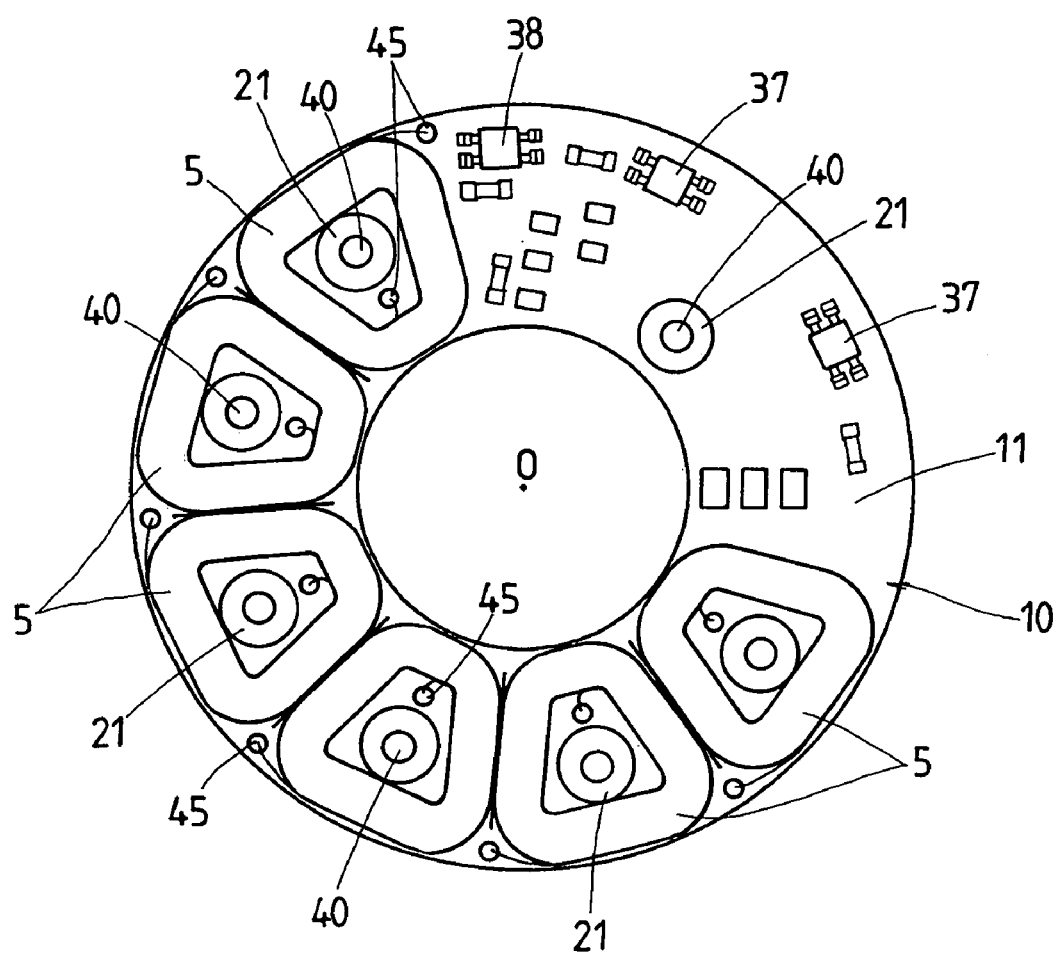
FIG. 8 is a plan view of an armature assembly incorporated in the position-control stage system shown in FIG. 1.

As seen in FIGS. 3 and 8, the armature windings 5 are made of coreless annular coils wound in a form of a flat configuration, and each provided therein with a collar 21 in which a hole 40 is formed to allow a flat-headed fastening screw 18 to extend through there to tighten the associated armature winding 5 onto the first retainer member 22, which is composed of a major portion 60 having a circular upper surface where the armature windings 5 are seated thereon, and the circular ridge 55 raised downwards at radially midway area of the major portion 60. The armature windings 5 are arranged on the circular upper surface 15 of the major portion 60 of the first retainer member 22 in juxtaposition with one another along a circular pattern in a way each of which extends across the overall radial dimension of the circular pattern. The circular ridge 55 of the first retainer member 22 fits closely inside the circular ridge 54 raised above the upper surface of the bed 2. The first retainer member 22, especially shown in FIG. 3, comes into close fit with the circular ridge 54 of the bed 2 in a way making a socket-and-spigot joint between them. Components for the armature assembly 10 are firmly secured in place to the bed 2 by the socket-and-spigot joint of the first retainer member 22 with the bed 2.

The field magnet 4 is composed of many permanent-magnet segments 4M, which are made in a simple rectangular shape and arranged in juxtaposition with one another to provide the field magnet 4 having a circular pattern as a whole. The permanent-magnet segments 4M for the field magnet 4 are closely juxtaposed in sequence in opposition to the armature windings 5 in the circular sink 14 underneath the turntable 1 in such a way alternating in polarity circularly, or with their unlike poles, or N-pole and S-pole, alternating in polarity along the circular direction. Thus, the turntable 1 includes a major portion 61 made on the underneath thereof with the circular sink 14 where the permanent-magnet segments 4M lie in juxtaposition in the circular direction, the cylindrical journal portion 52 extended downwards at the center of the turntable 1, and a circular flange 20 raised downwards above the underneath of the major portion 61 around an outside periphery of the major portion 61. Moreover, the turntable 1 is made with magnetic material to serve as magnet yoke to complete magnetic path.

Figure 7:
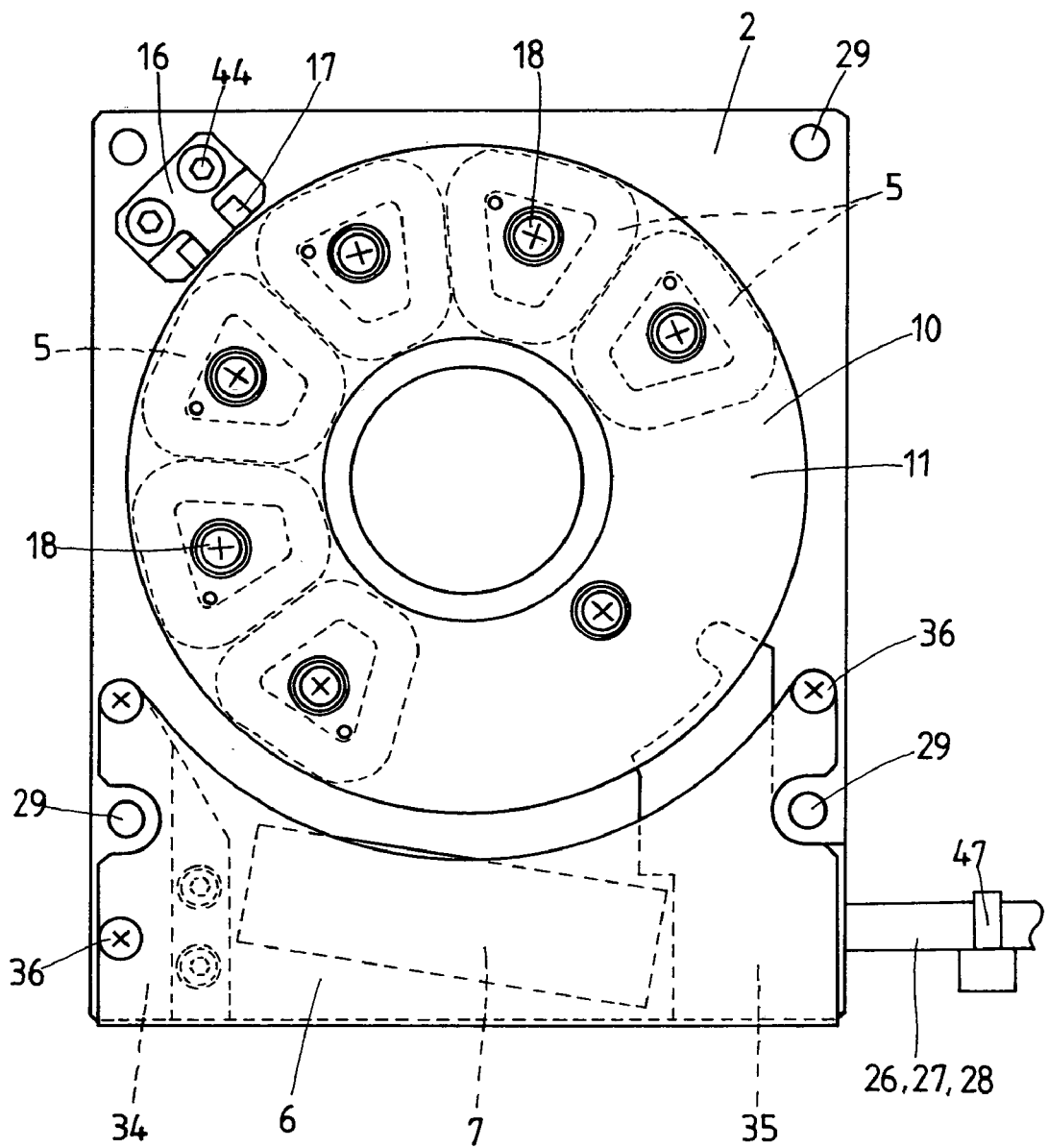
FIG. 7 is a plan view of the position-control stage system of FIG. 1, but in which the turntable is removed.

The position-control stage system of the present invention constructed as stated earlier is especially expected to ensure much space to install the armature assembly 10 on the bed 2 to make the propulsion to force the turntable 1 more powerful. To this end, the position-control stage system of the present invention features that the armature windings 5 are installed on the first retainer member 22 prepared for keeping in place the outer race 12 of the rolling-contact bearing 3. This constructional feature allows the armature windings 5 to have an enlarged dimension enough to extend across the overall radial length of the first retainer member 22. The armature windings 5, because of made so large in coil side as to extend across the overall radial length of the first retainer member 22 as apparent from FIGS. 3 and 7, is allowed to occupy an area as large as possible in radial direction. Thus, the position-control stage system of the present invention is envisaged making the most of much space permitted to install the armature windings 5 there to make the propulsion to force the turntable 1 more powerful. The constructional feature as stated just earlier helps make the position-control stage system reduced in the overall height (H), thereby making the stage system itself compact or slim in construction. Moreover, the first retainer member 22 to embrace the outer race 12 of the rolling-contact bearing 3 is made to get it doubling as magnet yoke to complete magnetic path, while the armature windings 5 are seated on the upper surface of the first retailer plate 22. This constructional feature helps get the position-control stage system even smaller in the overall height (H).

The position-control stage system of the present invention is expected to turn in any desired circular direction across a preselected circular range or angles θ. Although but the preselected circular range or angles θ is set to ±20 degrees or 40 degrees in the embodiment explained here, it will be appreciated that the circular range where the turntable 1 is allowed to turn across there may be selected depending on desired operating conditions. The position-control stage system of the present invention is expected to shrink in outside diameter of the turntable 1 as even smaller as possible, compared with the position-control stage system disclosed in the commonly assigned Japanese Patent Application No. 2004-151305. In other words, the position-control stage system of the present invention, as shown in FIG. 3, although made reduced in the outside diameter (D) of the turntable 1 as well as the overall height (H) of the stage system itself, notably is most beneficial in making it easy to reduce the turntable 1 in the outside diameter (D) as even smaller as tolerable, compared with the existing position-control stage system.

Figure 9:
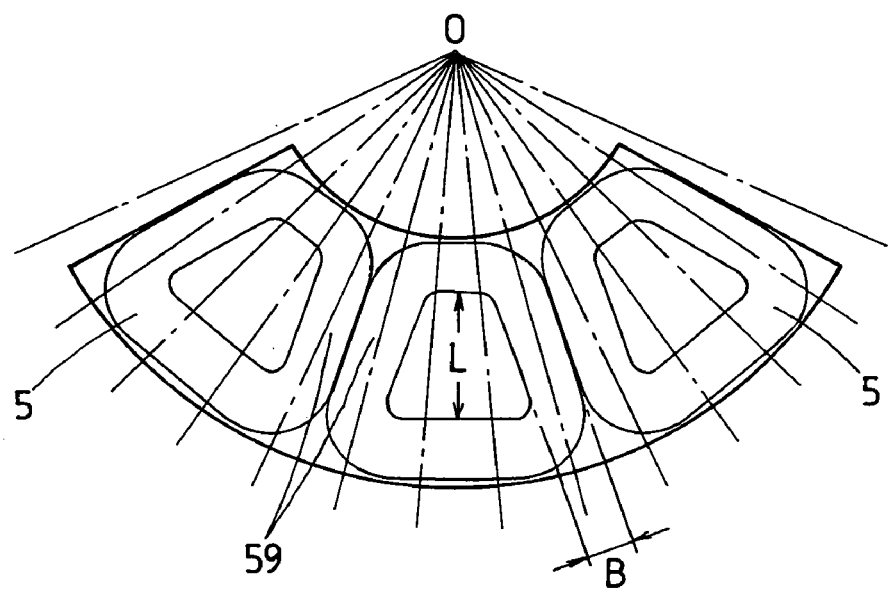
FIG. 9 is a schematic illustration in partial plan explanatory of geometry of armature windings in the armature assembly of FIG. 8.
Figure 10:
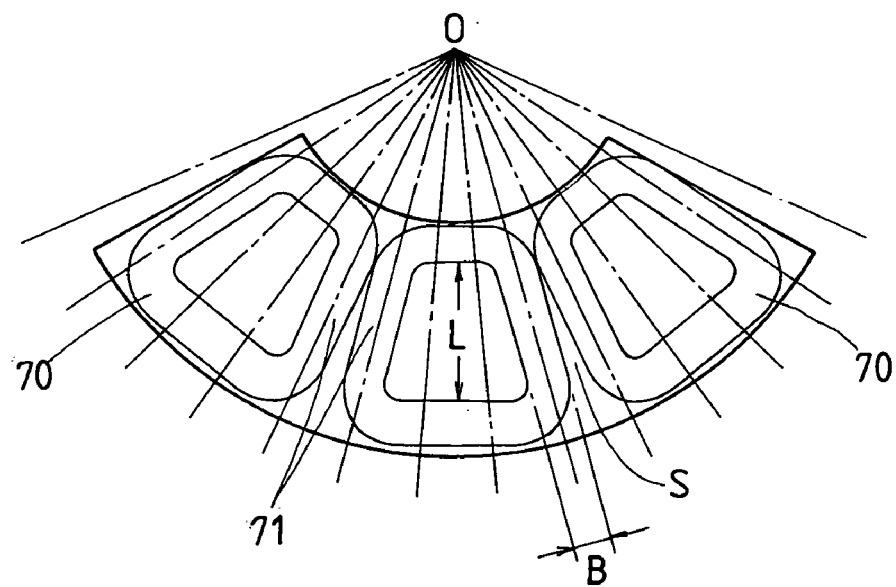
FIG. 10 is a schematic illustration in partial plan explanatory of prior geometry of armature windings.

The armature windings 5, as shown in FIGS. 8 and 9, are each made in the form of a coreless coil having two coil sides 59, each of which has a width (B) and a length (L). The armature windings 5 are arranged in close juxtaposition with one another in a circular direction in a way that their adjoining radial coil sides 59 become splayed in area with neither overlapping partially with one another, nor separating away from one another so as to make the most of an area (B)×(L) of the radial coil side to enhance the propulsion to turn the turntable 1. Unlike the armature windings 5 in the present invention, the armature winding 70 in the prior position-control stage system, as shown in FIG. 10, is made of a coreless winding that is made in the a trapezoid where widthwise middle lines of coil sides 71 extend to focus equally on a common center (O) of turning. Thus, the prior armature windings 70, when laid in close juxtaposition in a circular direction on any circular surface especially small in radial dimension, would be far away from one another to leave a clearance (S) between circularly opposing coil sides of any two adjoining armature windings 70, which increase in circular distance as the associated coil sides extend radially outwards. With the position-control stage system of the present invention, as seen from FIG. 9, the radial coil sides 59 of the armature winding 5 become considerably thick in width to prevent the clearance (S) from remaining between any circularly opposing coil sides 59 of the adjoining armature windings 5, thereby making it easy to provide the close juxtaposition of the armature windings 5. With the armature windings 5 in which the radial coil sides 59 thereof are made extended in width as stated earlier, the widthwise middle lines of radial coil sides 59 become failed to focus equally on a common center (O) of turning. Thus, this constructional feature in the radial coil sides 59 of the armature windings 5 as shown in FIG. 9 renders the efficiency in propulsion less and correspondingly in reverse the increased area of the radial coil sides 59 helps boost the propulsion to force the turntable 1, leading eventually to the high propulsion to drive the turntable 1.

The circular flange 20 rising around the outside periphery of the turntable 1 encloses both the armature windings 5 and the first retainer member 22 providing a yoke for the armature windings 5 to keep the magnetic flux against magnetic leakage and double as a cover to protect the armature assembly 10. The circular flange 20 surrounding around the turntable 1, especially shown in FIG. 3, extends sufficiently to conceal circumferentially all the armature windings 5 and the first retainer member 22 doubling as a yoke for the armature windings 5 to keep any foreign material against moving in and out the motor 24 as well as the magnetic flux against magnetic leakage.

Figure 6:
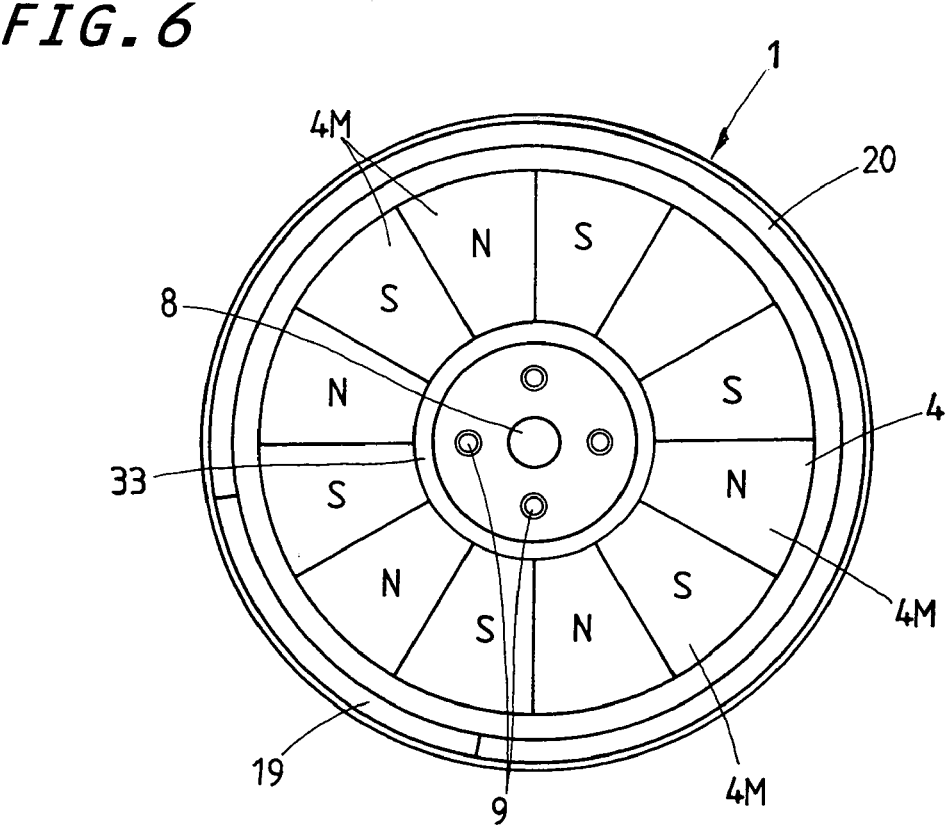
FIG. 6 is a bottom view of the turntable of FIG. 5.

With the position-control stage system shown in FIGS. 6, 7 and 8, the armature assembly 10 lying on the bed 2 is made up of six armature windings 5 and the field magnet 4 on the turntable 1 is made up of eleven magnet segments 4M, but the armature windings 5 lying on the bed 2 are available up to nine at the maximum in number while the magnet segments 4M are allowed to fit them on the turntable 1 up to twelve at the maximum. On a blank space left intact on the armature assembly 10 after the armature windings 5 have been installed, as shown in FIG. 8, there are provided Hall-effect elements or Hall ICs, some of which serve as limit sensors 37 and others are before-origin sensors 38. These limit sensors 37, 37 and the before-origin sensors 38 respond to the field magnet 4 to stop the turntable 1 within the allowable maximum turning range. That is, the position-control stage system of the present invention is made compact in construction, inclusive of controls for the stage system. When the highest torque is needed to force the turntable 1, alternatively, nine armature windings 5 are installed while twelve magnet segments 4M are selected for the field magnet 4.

Figure 4:
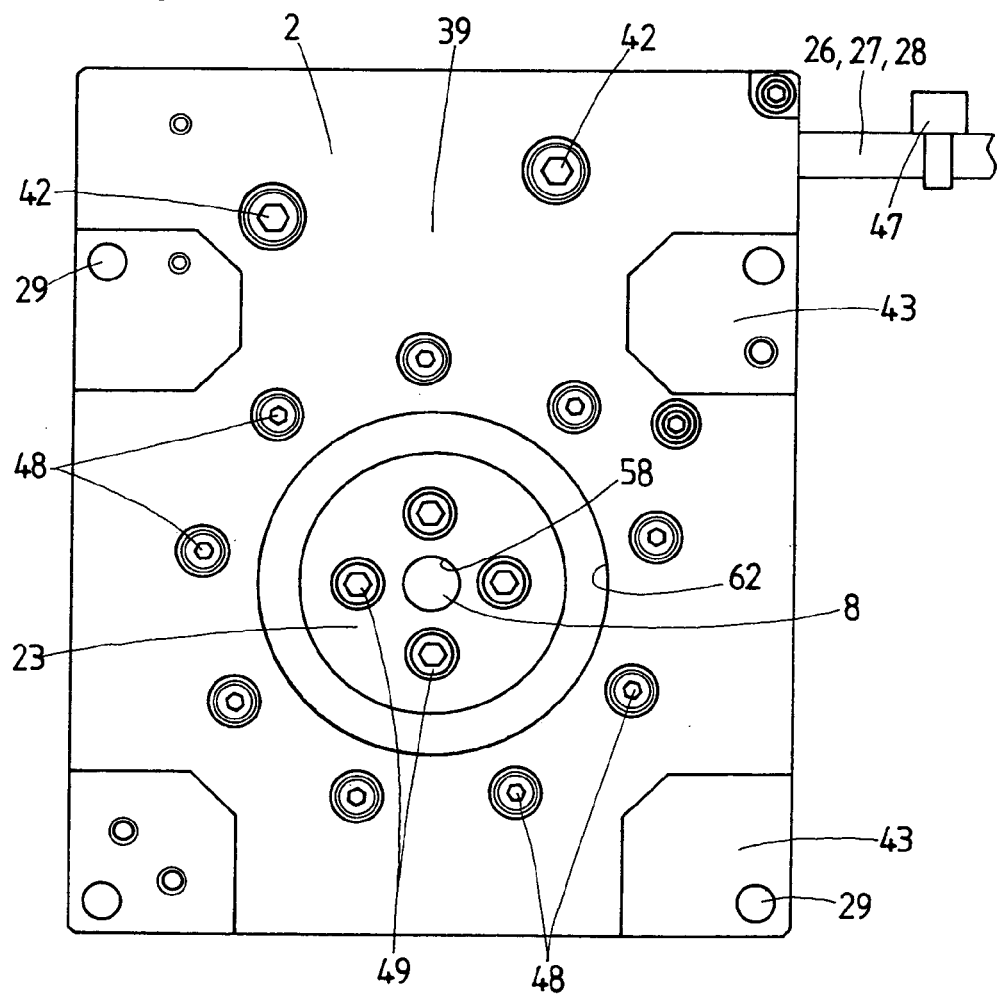
FIG. 4 is a bottom view of the position-control stage system shown in FIG. 1.

On the bed 2 of the position-control stage system of the present invention, as shown in FIGS. 1, 4 and 7, an origin mark 25 is installed in adjacency with the armature assembly 10 and a sensor 7 is fastened using a screw 42. The bed 2 moreover has a connector block 35 and another block 34 in close opposition to the armature assembly 10. The sensor 7 connects with a sensor line 26 while the armature assembly 10 is communicated with a power line 27 at terminals 45 to carry a three-phase current to the armature windings 5 and a signal line 28 to exchange a signal between the armature windings 5 and the others. The sensor line 26, power line 27 and signal line 28 are all gathered together with a retainer band 47 and joined to the connector block 35. A covering member 6 is fastened using screws 36 to another block 34 to shield the sensor 7, origin mark 25 and the connector block 35 that supports thereon the sensor line 26, power line 27 and the signal line 28.

Figure 2:
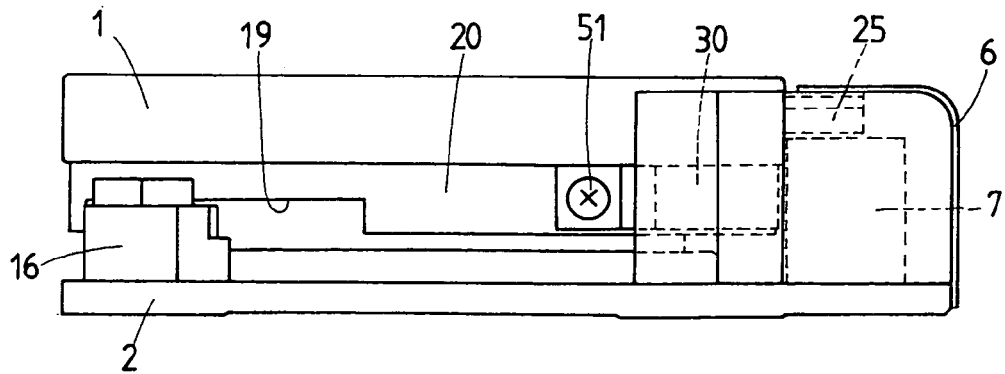
FIG. 2 is a view in side elevation of the position-control stage system of FIG. 1.
Figure 5:
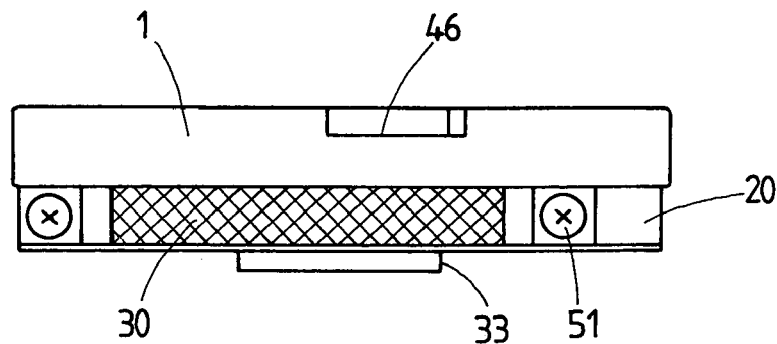
FIG. 5 is a view in front elevation of a turntable incorporated in the position-control stage system of FIG. 1, but in which an origin mark is removed.

The position-control stage system of the present invention, as shown in FIGS. 1, 2 and 5, further includes an encoder to sense a circular position of the turntable 1 relative to the bed 2, which are composed of an optical scale 30 fastened using a screw 51 on the turntable 1 to extend in the circular direction around a peripheral surface of the turntable 1, and a sensor 7 installed on the bed 2 in opposition to the optical scale 30. The origin mark 25 fits in a recess 46 cut in the circular surface of the turntable 1 in opposition to the sensor 7 to determine the home position of the turntable 1. With the position-control stage system of the present invention, moreover, as shown in FIGS. 1, 2, 6 and 7, a stopper 16 with a buffer 17 of urethane rubber is fastened using screws 44 on the bed 2 while the turntable 1 is made with a circular recess 19 to mate with the stopper 16 to keep the turntable 1 against turning beyond the preselected circular range.

With the position-control stage system of the present invention, the turntable 1 is made with some threaded holes 9 that are used to fasten any object including workpiece, other part, and so on thereto. The position-control stage system constructed as stated earlier is envisaged turning the turntable 1 towards any desired circular position within a preselected circular range θ to bring any object including instrument, component, workpiece, and so forth seated on the turntable 1 to any preselected location. In the embodiment of the position-control stage system discussed here, the preselected circular range where the turntable 1 is allowed to move in circular direction is set to ±20 degrees. The position-control stage system constructed as stated earlier is successful in making the turntable 1 smaller in the outside diameter (D) as well as the position-control stage system compact or slim in the overall height (H).

With the position-control stage system constructed as stated earlier, the moving turntable 1 has the field magnet 4 and the optical scale 30 while the stationary bed 2 has the sensor 7 and the retainer member 22 on which the armature coreless windings 5 are seated in close juxtaposition. Magnetic flux will head constantly from any one of the magnet segment 4M and the coil yoke of the retainer member 22 to the other in vertical direction, while revolving magnetic flux will develop around the armature windings 5 carrying current. Interaction of the vertical magnetic flux with the revolving magnetic flux will thus forces the armature windings 5 in horizontal direction. Switching over the armature current depending on the direction of magnetic flux develops continuously the propulsion or torque constant in circular direction, making the turntable 1 turn in any desired circular direction. Precise position control of the turntable 1 is accomplished by using the optical scale 30 together with acceleration control of the turntable 1, which is carried out depending on an amount of current applied to the armature windings 5.

What is claimed is:

1. A position-control stage system; comprising a bed, a turntable supported for rotation on the bed through a bearing, and a motor driving the turntable relative to the bed in a circular direction, the motor including a primary side having an armature assembly and a secondary side having a field magnet;

wherein the armature assembly is composed of armature windings made of coreless annular coils wound in a form of a flat configuration;

wherein the field magnet is composed of magnet segments made in a flat configuration, which are juxtaposed underneath the turntable in opposition to the armature windings in an array that alternates in polarity circularly in a circumferential direction;

wherein the bearing is fastened to the bed by a first retainer member secured to the bed;

wherein the armature windings are juxtaposed in a circumferential direction on a circular surface of the first retainer member in opposition to the field magnets;

wherein the first retainer member fits into the turntable which is allowed to turn relative to the first retainer member through the bearing so that the circular surface of the first retainer member lies in the circular recess defined between a journal portion extended at a center of the turntable and a circular flange raised around an outside periphery of the turntable; and wherein the armature windings are each made extended across an overall radial length of the circular surface of the first retainer member.

2. A position-control stage system constructed as recited in claim 1, wherein the first retainer member fits closely inside a circular ridge raised above an upper surface of the bed.

3. A position-control stage system constructed as recited in claim 1, wherein the coreless armature windings are disposed in close juxtaposition with one another in a way their adjoining radial coil sides become splayed in area with neither overlapping partially with one another, nor separating away from one another in circular direction.

4. A position-control stage system constructed as recited in claim 1, wherein the bearing is comprised of an inner race held in place with combination of the turntable and a second retainer member that is fastened to an axial end of the journal portion of the turntable, an outer race laid radially outside the inner race and held in place with combination of the bed and the first retainer member, and more than one rolling element of roller disposed between the inner and outer races in a circular direction in a way two adjacent rollers are oppositely inclined with their own axes intersecting alternatively one another.

5. A position-control stage system constructed as recited in claim 4, wherein the armature assembly is composed of the armature windings and a winding board extending to cover throughout over the armature windings, the armature assembly together with the first retainer member fits into the circular recess defined between the journal portion and the circular flange of the turntable, and the bed is made with an aperture to receive therein the second retainer member secured to the journal portion of the turntable.

6. A position-control stage system constructed as recited claim 1, wherein the circular flange rising around the turntable encloses both the armature windings and the first retainer member providing a yoke for the armature windings to keep magnetic flux against magnetic leakage and double as a cover to protect them.

7. A position-control stage system constructed as recited in claim 1, wherein the armature assembly lying on the bed through a first retainer member is made up of six armature windings while the field magnet on the turntable is made up of eleven magnet segments.

8. A position-control stage system constructed as recited in claim 1, wherein the armature windings lying on the bed through the first retainer member are available up to nine at the maximum in number while the magnet segments are allowed to fit them on the turntable up to twelve at the maximum.

* * * * *